(12) United States Patent
Mayer

(10) Patent No.: US 6,769,065 B2
(45) Date of Patent: Jul. 27, 2004

(54) ACCESS AUTHORIZATION DEVICE FOR CONTROLLING ACCESS REQUESTED BY AN OCDS MODULE

(75) Inventor: Albrecht Mayer, Deisenhofen (DE)

(73) Assignee: Infineon Technologies AG, Munich (DE)

( * ) Notice: Subject to any disclaimer, the term of this patent is extended or adjusted under 35 U.S.C. 154(b) by 580 days.

(21) Appl. No.: 09/777,443

(22) Filed: Feb. 6, 2001

(65) Prior Publication Data

US 2001/0016916 A1 Aug. 23, 2001

Related U.S. Application Data

(63) Continuation of application No. PCT/DE99/02365, filed on Aug. 2, 1999.

(30) Foreign Application Priority Data

Aug. 6, 1998 (DE) .......................................... 198 35 609

(51) Int. Cl.[7] .......................... G06F 12/04; G06F 11/27
(52) U.S. Cl. ...................... 713/200; 713/168; 713/167; 713/189; 713/193
(58) Field of Search ................................ 713/193, 167, 713/168, 189; 714/30

(56) References Cited

U.S. PATENT DOCUMENTS

| 4,425,615 A | * | 1/1984 | Swenson et al. ............. 711/114 |
|---|---|---|---|
| 4,442,484 A | * | 4/1984 | Childs et al. ................ 711/163 |
| 4,669,043 A | * | 5/1987 | Kaplinsky ....................... 711/3 |
| 4,698,750 A | * | 10/1987 | Wilkie et al. ........... 365/185.04 |
| 4,849,942 A | * | 7/1989 | Farrugia ..................... 365/228 |
| 5,014,191 A | * | 5/1991 | Padgaonkar et al. ........ 711/163 |
| 5,175,840 A | * | 12/1992 | Sawase et al. .............. 711/103 |
| 5,293,610 A | * | 3/1994 | Schwarz ...................... 711/164 |
| 5,500,949 A | * | 3/1996 | Saito ........................... 711/100 |
| 5,758,059 A | * | 5/1998 | Alexander .................... 714/30 |

FOREIGN PATENT DOCUMENTS

| JP | 408030485 A | * | 2/1996 | ........... G06F/11/28 |
| WO | WO 98/07091 | | 2/1998 | |

\* cited by examiner

Primary Examiner—Gilberto Barrón
Assistant Examiner—Jung W Kim
(74) Attorney, Agent, or Firm—Laurence A. Greenberg; Werner H. Stemer; Gregory L. Mayback

(57) ABSTRACT

A program-controlled unit with an on-chip debug support (OCDS) module and a method for debugging a program-controlled unit fitted with the OCDS module by using an external debugger. The described program-controlled unit is characterized in that it includes an access authorization controller unit ensuring that read and/or write accesses to internal and/or external registers, storage and/or the like requested to the OCDS module by components that can be addressed by the OCDS module are executed only when the device requesting relevant access has proven its access authorization. This minimizes the danger of misusing the OCDS module in case of unlimited OCDS module performance.

16 Claims, 1 Drawing Sheet

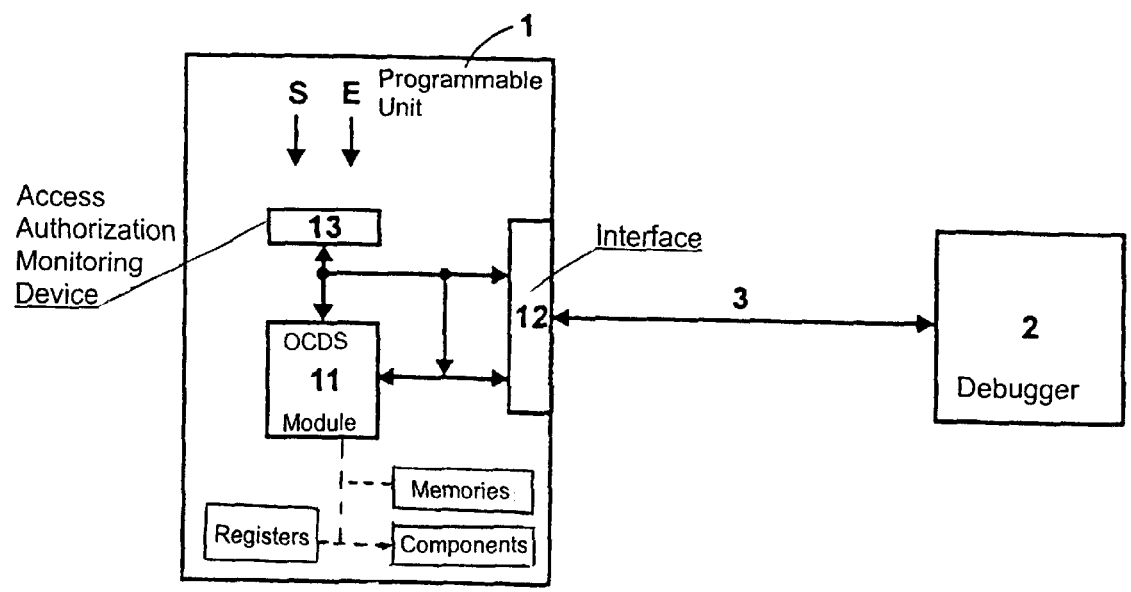

ACCESS AUTHORIZATION DEVICE FOR CONTROLLING ACCESS REQUESTED BY AN OCDS MODULE

CROSS-REFERENCE TO RELATED APPLICATION

This application is a continuation of copending International Application No. PCT/DE99/02365, filed Aug. 2, 1999, which designated the United States.

BACKGROUND OF THE INVENTION

Field of the Invention

The present invention relates to a programmable unit having an on-chip debug support (OCDS) module.

The programmable units under discussion are, for example, microprocessors, microcontrollers and the like. Widely differing embodiments of such units have been known for many years and require no more detailed explanation.

The on-chip debug support (OCDS) modules are now integrated in virtually all relatively modern programmable units. External debuggers can use such devices during "normal" operation of the relevant programmable units to access and influence these units in many ways. At the moment, this is primarily used in such a way that the relevant programmable units are automatically stopped on reaching interrupt conditions which can be preset, and/or in such a way that deliberate read and/or write accesses are made to the internal and external registers, memories and/or other components of the relevant programmable units, and/or to the systems containing them.

The external debuggers are devices that have been known for a long time and in a wide range of embodiments for searching for software and/or hardware faults that are present in the relevant programmable units or in the systems that contain them.

The OCDS modules change the external debuggers (whose configuration is relatively simple) into very powerful tools, by which even programmable units which are highly complex and/or which operate very fast can be monitored and checked comprehensively and efficiently.

However, the OCDS modules also make it possible to access or to manipulate data or programs which need to be kept secret for security and/or competition reasons, by read and/or write accesses of the OCDS modules to internal and/or external registers, memories, or other components which can be addressed via the OCDS modules. Clearly, this is undesirable.

SUMMARY OF THE INVENTION

It is accordingly an object of the invention to provide a programmable unit which overcomes the above-mentioned disadvantages of the prior art devices of this general type, such that, while the performance of the OCDS module remains high, the risk of its misuse can be reduced to a minimum.

With the foregoing and other objects in view there is provided, in accordance with the invention, a system having a programmable unit and a device for accessing the programmable unit. The programmable unit contains an on-chip debug support (OCDS) module, registers addressable by the OCDS module, memories addressable by the OCDS module, other components addressable by the OCDS module, and an access authorization monitoring device connected to the OCDS module. The access authorization monitoring device ensures that read and write accesses demanded from the OCDS module to the registers, the memories and/or the other components which can be addressed through the OCDS module are carried out only if the device demanding relevant accesses has a verified authorization for this.

Accordingly, the invention provides that the programmable unit has an access authorization monitoring device which is used to ensure that read and write accesses demanded from the OCDS module to the internal and/or external registers, the memories and/or the other components which can be addressed via the OCDS module are carried out only if the device demanding the relevant accesses has verified its authorization to perform desired functions.

The decision as to whether the OCDS module carries out the (security-critical) read and write accesses demanded from it to the internal and/or external registers, the memories and/or the other components which can be addressed via the OCDS module is thus made dependent on the device requesting the accesses. The requested accesses are actually carried out only if the device can verify that it is authorized to request such accesses; in all other cases, such accesses are not carried out.

Since the details of the required authorization verification are known only to the manufacturer of the programmable unit or of the system which contains the programmable unit, this manufacturer can define whether and, if appropriate, by whom, the OCDS module can be used without restriction by signaling the details of the authorization verification. All other persons can use the OCDS module only to an extent that does not allow any accesses to security-relevant data or programs.

In this case, it is possible to allow a device which can use the OCDS module in an unrestricted manner (after authorization verification) to cause the programmable unit to be reset, after which, exceptionally,—without any limitation to the present access authorization to the OCDS module—no renewed authorization verification is required by the relevant device. Then, despite the security mechanism installed in the programmable unit, the processes which take place after resetting the programmable unit can also be monitored from the start, without any restriction and without any gaps.

In accordance with an added feature of the invention, the process of carrying out the read and write accesses demanded from the OCDS module to the registers, the memories and/or the other components which can be addressed through the OCDS module is suppressed if and for as long as an inhibit signal is set and received by the access authorization monitoring device.

In accordance with an additional feature of the invention, the access authorization monitoring device has an input receiving the inhibit signal, and the inhibit signal is set automatically after a resetting of the programmable unit.

In accordance with another feature of the invention, the inhibit signal is reset by verification of an authorization to request the read and write accesses to the registers, the memories and/or the other components which can be addressed through the OCDS module.

In accordance with a further feature of the invention, the inhibit signal is, exceptionally, not set after the resetting of the programmable unit if a security-cancellation signal is set and received by the access authorization monitoring device.

In accordance with another added feature of the invention, the security-cancellation signal is not reset by the resetting of the programmable unit.

In accordance with another further feature of the invention, the security-cancellation signal can be set only if the programmable unit has connected to it the device which is authorized to request the read and write accesses to the registers, the memories and/or the other components which can be addressed through the OCDS module, and has verified the authorization.

In accordance with a concomitant feature of the invention, a verification of an authorization to request the read and write accesses to the registers, the memories and/or the other components which can be addressed through the OCDS module is produced by a transmission of at least one of predetermined data and a predetermined data string from the device requesting the authorization to the programmable unit.

Other features which are considered as characteristic for the invention are set forth in the appended claims.

Although the invention is illustrated and described herein as embodied in a programmable unit, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWING

The single FIGURE of the drawing is a block diagram of a configuration for debugging a programmable unit using an external debugger and according to the invention.

DESCRIPTION OF THE PREFERRED EMBODIMENT

Referring now to the single FIGURE of the drawing in detail, there is shown a programmable unit 1 to be debugged which is a microcontroller in the example under consideration. However, it could just as well be any other programmable unit, such as a microprocessor. An external debugger 2 for debugging the programmable unit 1 is provided.

The programmable unit 1 contains, inter alia, an on-chip debug support (OCDS) module 11, a debug interface 12, and an access authorization monitoring device 13.

The programmable unit 1 and the debugger 2 are connected via a link 3 that contains one or more lines.

The link 3 opens at the programmable unit 1 end into the debug interface 12 which, for its part, has links to the OCDS module 11 and to the access authorization monitoring device 13.

The debug interface 12 is, for example, the so-called JTAG interface. The JTAG interface and its use as a debug interface are known, and require no further explanation.

The OCDS module 11 is a device that assists the debugger 2. During "normal" operation of the programmable unit 1, the OCDS module 11 makes it possible to access and influence the programmable unit 1 in many ways. In particular, it makes it possible for the programmable unit 1 to be stopped automatically on reaching break conditions which can be predetermined, and/or for deliberate read and/or write accesses to be made to registers 4 including internal and external registers, memories 5 and/or other components 6 of the programmable unit 1 and/or of a system which contains the programmable unit 1.

The already mentioned access authorization monitoring device 13 monitors whether and to what extent the debugger 2 is authorized via the OCDS module 11 to read from and write to the registers 4, the memories 5 and/or other components 6, which can be addressed via the OCDS module 11, of the programmable unit 1 or of the system which contains it. The access authorization monitoring device 13 is used to ensure that read and write accesses demanded from the OCDS module 11 to the registers 4, the memories 5 and/or other components 6 which can be addressed via the OCDS module 11 are carried out only if the device (that is to say, for example, the debugger 2) requesting the relevant accesses has verified authorization for this purpose.

In the example under consideration, the access authorization monitoring device 13 operates as a function of an inhibit signal S which—apart from exceptional cases which will be described in more detail later—is set automatically whenever the programmable unit 1 is reset. If and for as long as the inhibit signal S is set, the access authorization monitoring device 13 prevents any read and write accesses demanded from the OCDS module 11 to the internal and/or external registers 4, the memories 5 and/or other components 6, which can be addressed via the OCDS module 11, of the programmable unit 1 or of the system which contains the programmable unit 1 from being carried out.

The prevention of the protected read and write accesses can be carried out by the access authorization monitoring device 13 itself influencing the OCDS module 11 which carries out the accesses, and/or by influencing the debug interface 12 and/or the link between the OCDS module 11 and the debug interface 12.

The inhibit signal S, which is set as standard, is reset when the debugger 2, or a device connected to the programmable unit 1 instead of the debugger 2, verifies that the relevant device is authorized to request read and write accesses to the internal and/or external registers 4, the memories 5 and/or the other components 6 which can be addressed via the OCDS module 11.

This authorization can be verified, for example, by the transmission of predetermined data or a predetermined data string from the device requiring protected read or write accesses to the programmable device 1.

If and for as long as the inhibit signal S is reset, read and write accesses, requested by the debugger 2 or by a device connected to the programmable unit 1 instead of it, to the internal and/or external registers 4, the memories 5 and/or the other components 6 which can be addressed via the OCDS module 11, are carried out by the OCDS module 11.

The inhibit signal S and its evaluation by the access authorization monitoring device 13 thus allow read and write accesses to the internal and/or external registers 4, the memories 5 and/or other components 6, which can be addressed via the OCDS module 11, of the programmable unit 1 or of the system which contains it to be carried out only by persons who are the authorized holders of the debugger 2 or other appliance by which authorization verification can be produced.

Only the manufacturer of the programmable unit 1 and/or the manufacturer of the system which contains the relevant programmable unit 1 know/knows the detailed procedure to verify the authorization. It is thus possible for only a small number of selected persons to be given the capability for unlimited access to the programmable unit 1; all other persons must be satisfied with the limited performance of the OCDS module 11.

With regard to all this, it should be noted that the OCDS module 11 which can be used only to a limited extent is far from being unusable; even with a limited functional scope, it is a valuable aid for debugging the relevant programmable unit 1. For example, as before, break conditions can be preset and their occurrence can be monitored, and data intended for the programmable unit 1 can be provided for retrieval or transfer, and/or (non security-critical) data provided for retrieval by the programmable unit can be retrieved from it.

The method by which it is made impossible for every debugger 2 to access the programmable unit 1 without any limitation via the OCDS module 11 is—as has already been mentioned above—created by setting the inhibit signal S after the resetting of the programmable unit 1.

In the example under consideration, the inhibit signal S is not in all circumstances set after the resetting of the programmable unit 1; there is one exception in which this is not the case.

The exceptional situation occurs when a security-cancellation signal E is set. The security-cancellation signal E can be set by the programmable unit 1, by the debugger 2, or by a device which is connected to the programmable unit 1 instead of the debugger 2, provided that the debugger 2 or the device which is connected to the programmable unit 1 instead of the debugger 2 has previously verified its authorization for unlimited use of the OCDS module 11.

The security-cancellation signal E can be reset only by the debugger 2 or by the device that is connected to the programmable unit 1 instead of the debugger 2. Therefore, the security cancellation signal E is not simply reset by resetting the programmable unit 1 as a consequence of internal and/or external events and/or commands.

The setting of the security-cancellation signal E by the debugger 2 results in that the reset inhibit signal S is not set after the resetting of the programmable unit 1. In this case, after the resetting of the programmable unit 1, there is no need for the debugger 2 to repeat its verification of its authorization to request read and write accesses to the internal and/or external registers 4, the memories 5 and/or the other components 6, which can be addressed via the OCDS module 11, of the programmable unit 2 or of the system which contains this unit. The debugger 2 is thus able to follow events that take place after the resetting of the programmable unit 1, from the start, without any limitation and without any gaps.

The above statements have in each case related to the prevention of specific read and write accesses by the OCDS module 11. The subject matter of limitations may additionally or alternatively also relate to any other functions of the OCDS module 11. In this case, different authorization verifications can also be requested for different functions of the OCDS module 11.

The described apparatus and the described method make it possible in a surprisingly simple manner to reduce the risk of misuse of the OCDS module 11 to a minimum, while not limiting the performance of the OCDS module 11.

I claim:

1. A programmable unit, comprising:
an on-chip debug support (OCDS) module;
registers addressable by said OCDS module;
memories addressable by said OCDS module;
other components addressable by said OCDS module; and
an access authorization monitoring device connected to said OCDS module, said access authorization monitoring device being adapted for interfacing with a debugger device for accessing the programmable unit and ensuring that read and write accesses demanded from said OCDS module to at least one of said registers, said memories and said other components which can be addressed through said OCDS module are carried out only if the debugger device demanding relevant accesses has a verified authorization therefor.

2. The programmable unit according to claim 1, wherein a process of carrying out the read and write accesses demanded from said OCDS module to at least one of said registers, said memories and said other components which can be addressed through said OCDS module is suppressed if and for as long as an inhibit signal is set and received by said access authorization monitoring device.

3. The programmable unit according to claim 2, wherein said access authorization monitoring device has an input receiving the inhibit signal, and the inhibit signal is set automatically after a resetting of the programmable unit.

4. The programmable unit according to claim 3, wherein the inhibit signal is reset by verification of an authorization to request the read and write accesses to at least one of said registers, said memories and said other components which can be addressed through said OCDS module.

5. The programmable unit according to claim 3, wherein the inhibit signal is, exceptionally, not set after the resetting of the programmable unit if a security-cancellation signal is set and received by said access authorization monitoring device.

6. The programmable unit according to claim 5, wherein the security-cancellation signal is not reset by the resetting of the programmable unit.

7. The programmable unit according to claim 5, wherein the security-cancellation signal can be set only if the programmable unit has connected to it the debugger device which is authorized to request the read and write accesses to at least one of said registers, said memories and said other components which can be addressed through said OCDS module, and has verified the authorization.

8. The programmable unit according to claim 1, wherein a verification of an authorization to request the read and write accesses to said registers, said memories and said other components which can be addressed through said OCDS module is produced by a transmission of at least one of predetermined data and a predetermined data string from the debugger device requesting the authorization to the programmable unit.

9. In a system having a programmable unit and a debugger device for accessing the programmable unit, the programmable unit comprising:
an on-chip debug support (OCDS) module;
registers addressable by said OCDS module;
memories addressable by said OCDS module;
other components addressable by said OCDS module; and
an access authorization monitoring device connected to said OCDS module, said access authorization monitoring device interfacing with the debugger device for accessing the programmable unit and ensuring that read and write accesses demanded from said OCDS module to at least one of said registers, said memories and said other components which can be addressed through said OCDS module are carried out only if the device demanding relevant accesses has a verified authorization therefor.

10. The programmable unit according to claim 9, wherein a process of carrying out the read and write accesses demanded from said OCDS module to at least one of said registers, said memories and said other components which can be addressed through said OCDS module is suppressed if and for as long as an inhibit signal is set and received by said access authorization monitoring device.

11. The programmable unit according to claim 10, wherein said access authorization monitoring device has an input receiving the inhibit signal, and the inhibit signal is set automatically after a resetting of the programmable unit.

12. The programmable unit according to claim 11, wherein the inhibit signal is reset by verification of an authorization to request the read and write accesses to at least one of said registers, said memories and said other components which can be addressed through said OCDS module.

13. The programmable unit according to claim 11, wherein the inhibit signal is, exceptionally, not set after the resetting of the programmable unit if a security-cancellation signal is set and received by said access authorization monitoring device.

14. The programmable unit according to claim 13, wherein the security-cancellation signal is not reset by the resetting of the programmable unit.

15. The programmable unit according to claim 13, wherein the security-cancellation signal can be set only if the programmable unit has connected to it the debugger device which is authorized to request the read and write accesses to at least one of said registers, said memories and said other components which can be addressed through said OCDS module, and has verified the authorization.

16. The programmable unit according to claim 9, wherein a verification of an authorization to request the read and write accesses to said registers, said memories and said other components which can be addressed through said OCDS module is produced by a transmission of at least one of predetermined data and a predetermined data string from the debugger device requesting the authorization to the programmable unit.

* * * * *